United States Patent [19]

Keightley

[11] Patent Number: 5,533,268
[45] Date of Patent: Jul. 9, 1996

[54] LASER DEFLECTION APPARATUS FOR LASER COMPASS

[75] Inventor: John Keightley, Langley, Canada

[73] Assignee: Miles D. Willetts, Surrey, England

[21] Appl. No.: 287,241

[22] Filed: Aug. 8, 1994

[51] Int. Cl.$^6$ .................................................. G01C 5/00
[52] U.S. Cl. .................. 33/290; 33/DIG. 21; 359/857
[58] Field of Search ............................. 33/281, 290, 291, 33/DIG. 21; 356/248, 250, 253, 254, 255; 359/857, 858, 861, 862

[56] References Cited

U.S. PATENT DOCUMENTS

| | | | |
|---|---|---|---|
| 3,471,234 | 10/1969 | Studebaker | 33/DIG. 21 |
| 3,694,095 | 9/1972 | Louthan | 356/255 |
| 3,856,409 | 12/1974 | Cindrich et al. | 33/291 |
| 3,892,475 | 7/1975 | Bardocz | 359/857 |
| 4,367,017 | 1/1983 | Jimbou et al. | 359/857 |
| 5,012,585 | 5/1991 | DiMaggio . | |
| 5,033,848 | 7/1991 | Hart et al. | 33/291 |
| 5,075,977 | 12/1991 | Rando . | |
| 5,142,788 | 9/1992 | Willetts . | |
| 5,218,770 | 6/1993 | Toga . | |
| 5,368,392 | 11/1994 | Hollander et al. | 33/DIG. 21 |
| 5,485,266 | 1/1996 | Hirano et al. | 33/281 |

OTHER PUBLICATIONS

Laser Compass—Prototype Design Study—Pthalo Systems Inc., Mar., 1993.

Primary Examiner—Thomas B. Will
Attorney, Agent, or Firm—Merchant, Gould, Smith, Edell, Welter & Schmidt

[57] ABSTRACT

An apparatus for projecting a laser beam at an angle to an axis and sweeping the laser beam around the axis around a conical surface having a selected slope is described. The apparatus may be used to aid in the alignment of structures having conical surfaces. The apparatus projects a laser beam along an axis onto a rotating deflection assembly. The deflection assembly contains two mirrors which are optically equivalent to the reflective faces of a pentaprism. Consequently, the angle of the deflected beam is relatively insensitive to vibrations of the deflection assembly. The angle of the deflected beam may be varied by tilting the two mirrors. The alignment of the mirrors is maintained as the mirrors are tilted by a linkage which includes a roller mounted to one of the mirrors which rides on a cam surface coupled to the other mirror. The adjustable mirror-alignment linkage may be used in other optical equipment.

17 Claims, 5 Drawing Sheets 5,533,268

LASER DEFLECTION APPARATUS FOR LASER COMPASS

FIELD OF THE INVENTION

This invention pertains to a apparatus for projecting a laser beam at an angle to an axis and sweeping the laser beam around the axis around a conical surface having a selected slope. The device may be used to aid in the alignment of structures having conical surfaces. This invention also pertains to a vibration insensitive apparatus for deflecting a laser beam through an angle.

BACKGROUND OF THE INVENTION

Laser levels are used in surveying and building construction. Such laser levels project a laser beam perpendicular to a vertical axis and rotate the laser beam around the axis. The plane of the laser beam is horizontal and can therefore be used as a reference elevation.

In building large conical structures, such as the floors of concentrators and digesters it is often important that the conical surface be symmetrical and have a uniform slope. This can be done with a laser level, by varying the height of the laser level and marking the desired elevations in concentric circles. There are many steps in laying out a conical surface with this method. Each step introduces a potential for errors.

Willetts, U.S. Pat. No. 5,142,788 discloses a laser compass which may be used for laying out large circles on surfaces, such as ceilings. The Willetts device includes a laser and a rotating mirror. The laser generates a laser beam which is projected along an axis onto the rotating mirror and is deflected by the rotating mirror. As the mirror rotates the deflected laser beam is swept around a cone-shaped surface. The accuracy of the device described in U.S. Pat. No. 5,142,788 may be impaired if the bearings on which the rotating mirror is mounted are not perfect. The device is therefore difficult to adopt for use in accurately aligning large conical surfaces where high precision is required without using prohibitively expensive bearings.

SUMMARY OF THE INVENTION

This invention provides an improved laser compass. The laser compass comprises: a base; a frame mounted to the base for rotation about an axis; a motor operatively associated with the frame for rotating the frame about the axis; a laser for projecting a laser beam along the axis; and deflection means for redirecting the laser beam at an angle to the axis to sweep out a cone. The deflection means comprises a first mirror on the axis pivotally mounted to the frame for deflecting the laser beam along a first line at a first angle to the axis; a second mirror on the first line pivotally mounted to the frame for deflecting the laser beam along a second line at an angle to the axis; and mirror pivoting means for setting angles of the first and second mirrors relative to the axis. The mirror pivoting means comprises: a cam surface coupled to the second mirror for pivoting with the second mirror; a first arm coupled to the first mirror for pivoting with said first mirror; and bias means for biasing a cam-contacting surface on the first arm against the cam surface. The first and second mirrors act in a manner analogous to the reflective sides of a pentaprism. The angle of the deflected laser beam relative to the axis is relatively insensitive to small movements of the rotating frame relative to the axis.

The invention also provides apparatus for deflecting a laser beam being projected along an axis by a laser at an angle to the axis. The apparatus comprises: a frame and deflection means on the frame for redirecting the laser beam at an angle to the axis. The deflection means comprises: a first mirror on the axis pivotally mounted to the frame for deflecting the laser beam along a first line at a first angle to the axis; a second mirror on the first line pivotally mounted to the frame for deflecting the laser beam along a second line at an angle to the axis; and mirror pivoting means for adjusting angles of said first and second mirrors relative to the axis. The mirror pivoting means comprises: a cam surface coupled to the second mirror for pivoting with the second mirror; a first arm coupled to the first mirror for pivoting with the first mirror; and bias means for biasing a cam-contacting surface on the first arm against the cam surface; and a linkage for moving the second mirror to a desired angle to the frame and holding the second mirror at the desired angle.

DETAILED DESCRIPTION OF THE PREFERRED EMBODIMENT

Figure 1:
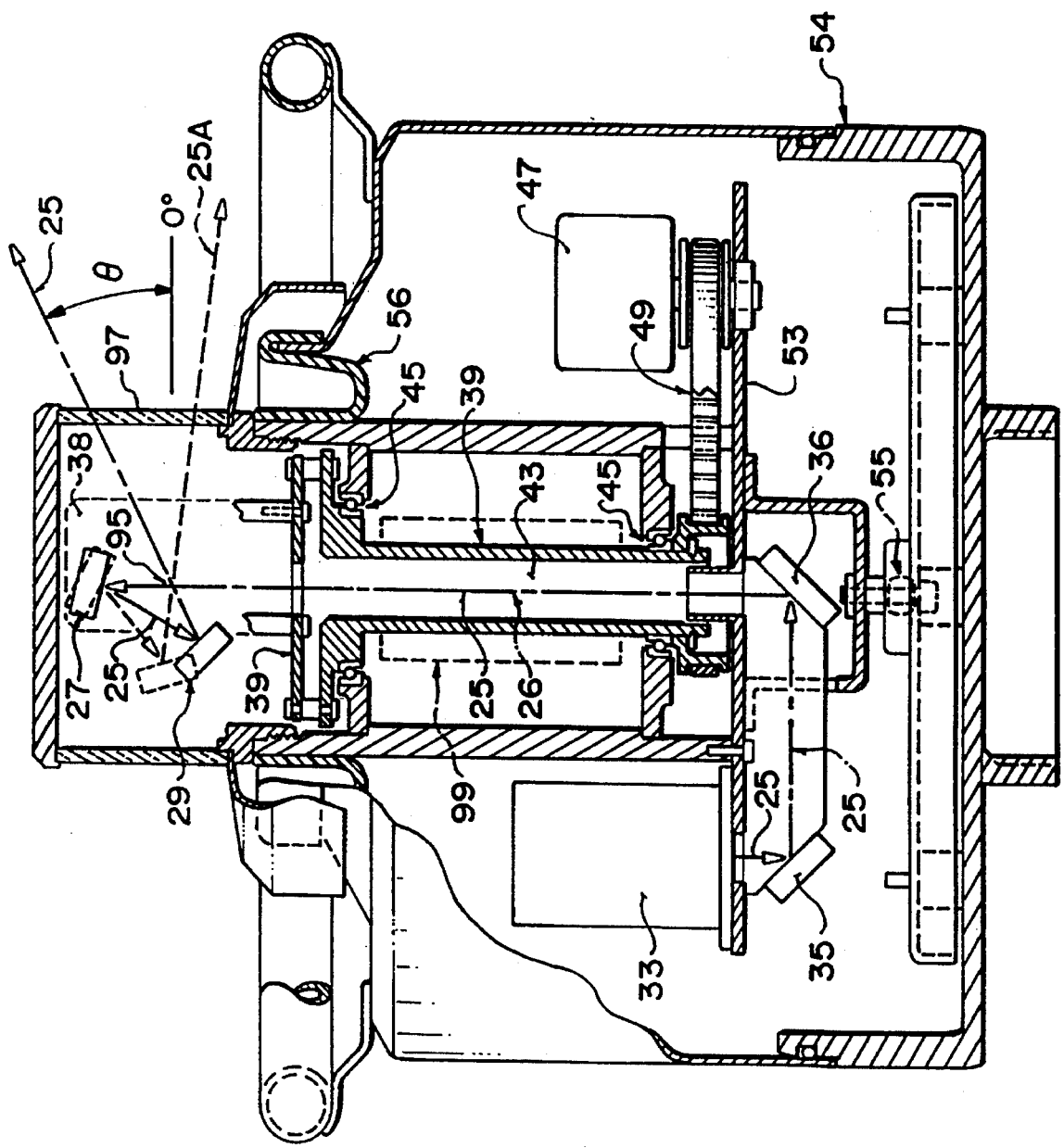
FIG. 1 is a section through a laser compass according to the invention.
Figure 2:
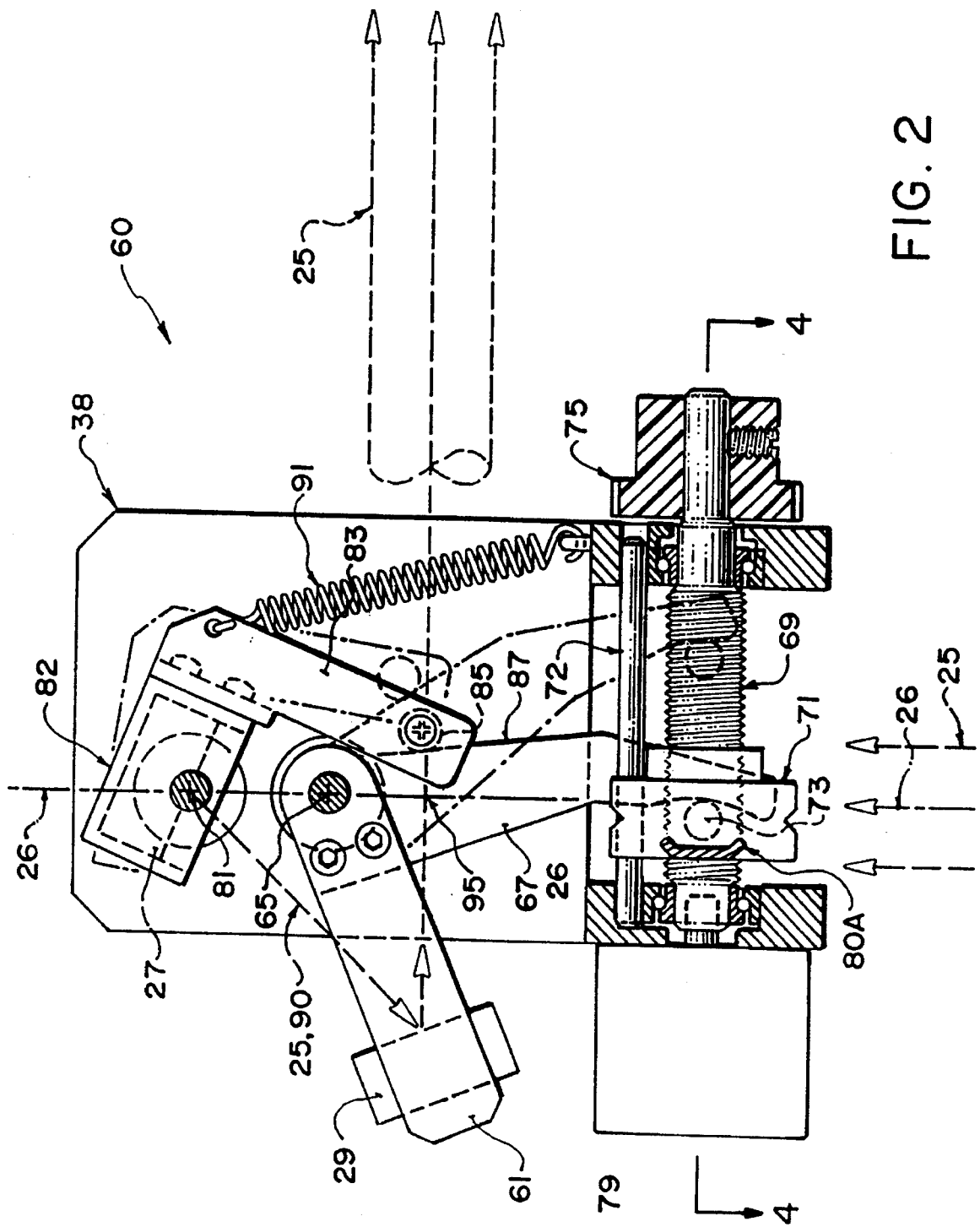
FIG. 2 is a section through a laser beam deflector from the apparatus of FIG. 1.

A laser compass generates a laser beam 25 which is swept around a cone-shaped surface centered on axis 26. The angle $\theta$ of laser beam 25 to the horizontal may be varied by changing the angle of first mirror 27 and second mirror 29. When $\theta$ is set to 0 degrees then the laser compass may be used as a standard laser level as shown in FIG. 2. FIG. 1 shows laser beam 25 in its maximally upwardly deflected position. The maximally downwardly deflected position of laser beam 25 is shown in dashed outline as 25A.

Laser beam 25 is generated by a laser 33 which may be, for example, an infra-red (I.R.) laser diode assembly, such as a model 06DLL 205 laser diode head available from Melles Griot of Irvine, Calif. Laser 33 may also be a visible light laser. Laser 33 generates laser beam 25 which is projected downwardly onto mirror 35. Mirrors 35 and 36 reverse the direction of laser beam 25 and project it upwardly along axis 26 through an aperture 43 in a barrel 39. Mirror 36 may be provided with adjustment means (not shown) to align laser beam 25 with axis 26. After passing through aperture 43, laser beam 25 hits first mirror 27 and is reflected onto second mirror 29. Second mirror 29 reflects laser beam 25 along a line which intersects axis 26 at point 95 and extends away from the laser compass through a window 97.

Window 97 is preferably constructed of a number of flat panes rather than a single cylindrical window. Window 97 should either have no vertical wedge angle (i.e. the thickness of the glass should not vary with vertical position) or should have a vertical wedge angle which is constant around the periphery of window 97. This is easier to accomplish with a window made of flat panes than with a cylindrical window. For example, window 97 may be constructed of six flat panes of glass arranged in a hexagon, when viewed from above. If window 97 is a cylindrical window then cylindrical corrective lenses in the path of laser 25 may be needed to reverse distortions produced by the window 97.

In the alternative, window 97 may be a section of a sphere centered on point 95. This alternative construction has the advantage that laser beam 25 is always perpendicularly incident on window 97 but has the disadvantage of being very expensive and difficult to accurately construct.

Figure 5:
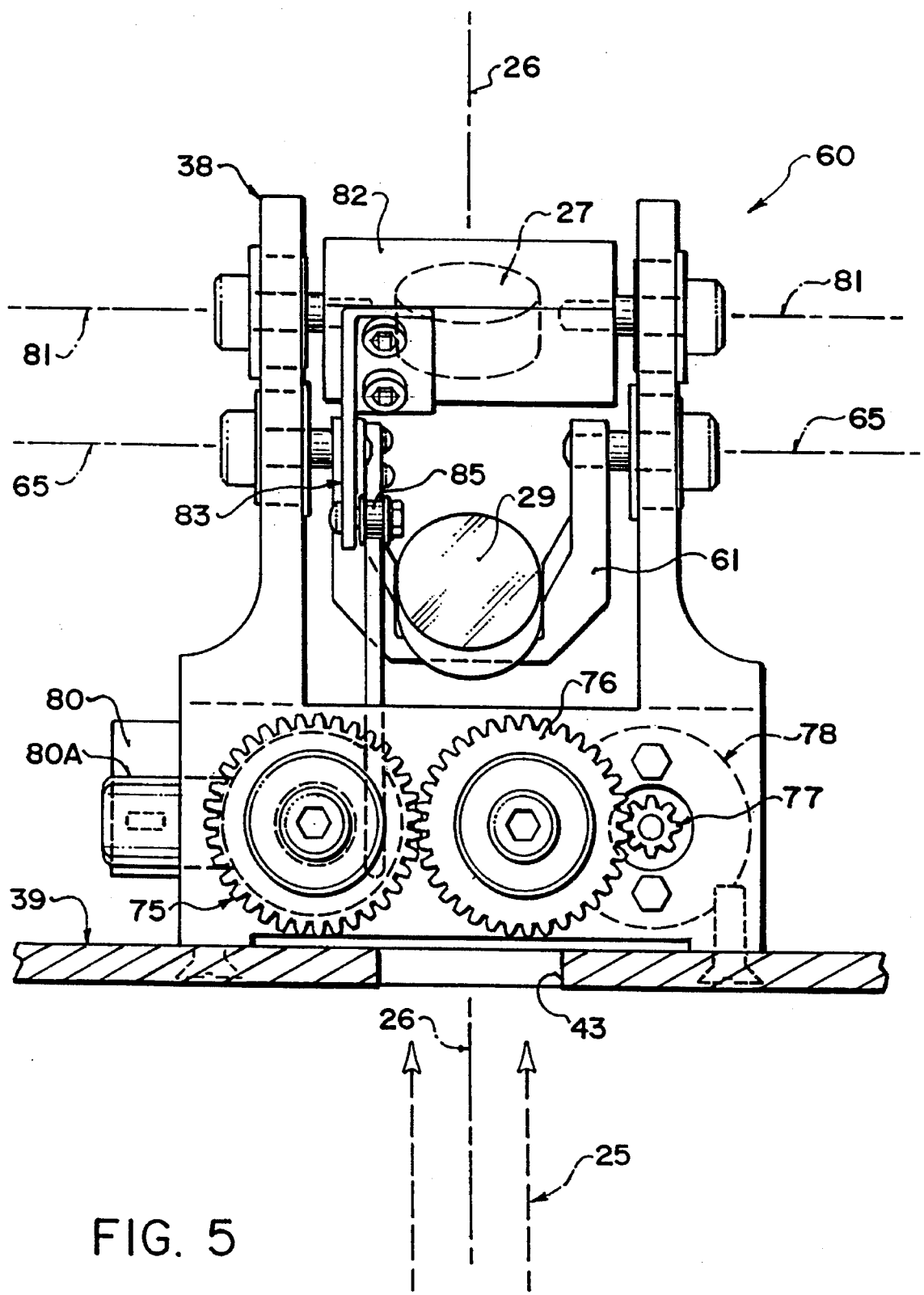
FIG. 5 is a front elevation of the laser beam deflector of FIG. 2.

First mirror 27 and second mirror 29 are pivotally mounted to a frame 38 (FIG. 5). Frame 38 is fixed to barrel 39 which is rotatably mounted to laser compass 20 by means of bearings 45. Barrel 39 is rotated about axis 26 by a motor 47 and drive-belt 49. Preferably barrel 39 is rotated at a rate of approximately 250 revolutions per minute (r.p.m.). However, if a visible light laser is used, it may be desirable to make the rate of rotation of barrel 39 variable, preferably in the range of 60 to 300 revolutions per minute to aid in visual pick-up of laser beam 25. Frame 38 and first and second mirrors 27 and 29 rotate together with barrel 39. It is important that, for any selected angle of deflection of laser beam 25, mirrors 27 and 29 do not move with respect to frame 38 as barrel 39 and frame 38 rotate. Laser beam 25 projected through window 97 sweeps out a cone having a slope θ.

Laser 33 and motor 47 are mounted to a base 53. The angle of base 53 can be adjusted with respect to the case 54 of the laser compass by means of a levelling mechanism of known construction (not shown) which pivots base 53 about pivot point 55. The levelling mechanism may be, for example, an automatic levelling mechanism of the type used in standard laser levels. A flexible bellows 56 is provided to permit movement of base 53 relative to case 54 while preventing dirt and moisture from entering case 54. The levelling mechanism allows axis 26 to be made vertical even if case 54 is not perfectly vertical.

FIG. 2 shows in detail a beam deflecting mechanism 60 according to the invention. As the angle θ of projected laser beam 25 is adjusted by moving second mirror 29, the angle of first mirror 27 is automatically adjusted to keep laser beam 25 incident on the center of second mirror 29 (in FIG. 2, θ is shown set at 0°). Because first and second mirrors 27 and 29 always are in position to intercept laser beam 25, first and second mirrors 27 and 29 may be relatively small.

Second mirror 29 is mounted at one end of a yoke 61. Yoke 61 has two arms pivotally mounted to frame 38 for rotation about an axis 65. Axis 65 intersects perpendicularly axis 26. Second mirror 29 may, less preferably, be supported at an end of a single arm.

A second arm 67, is fixed relative to yoke 61 and projects downwardly adjacent to a lead screw 69. Nut 71 is threaded onto lead screw 69 so that rotation of lead screw 69 causes nut 71 to travel along lead screw 69. Nut 71 is prevented from rotating by shaft 72. A pin 73 projecting from nut 71 bears against a surface on arm 67 such that when lead screw 69 is rotated, nut 71 travels along lead screw 69 and pin 73 pushes arm 67, thereby pivoting mirror 29 about axis 65.

Figure 4:
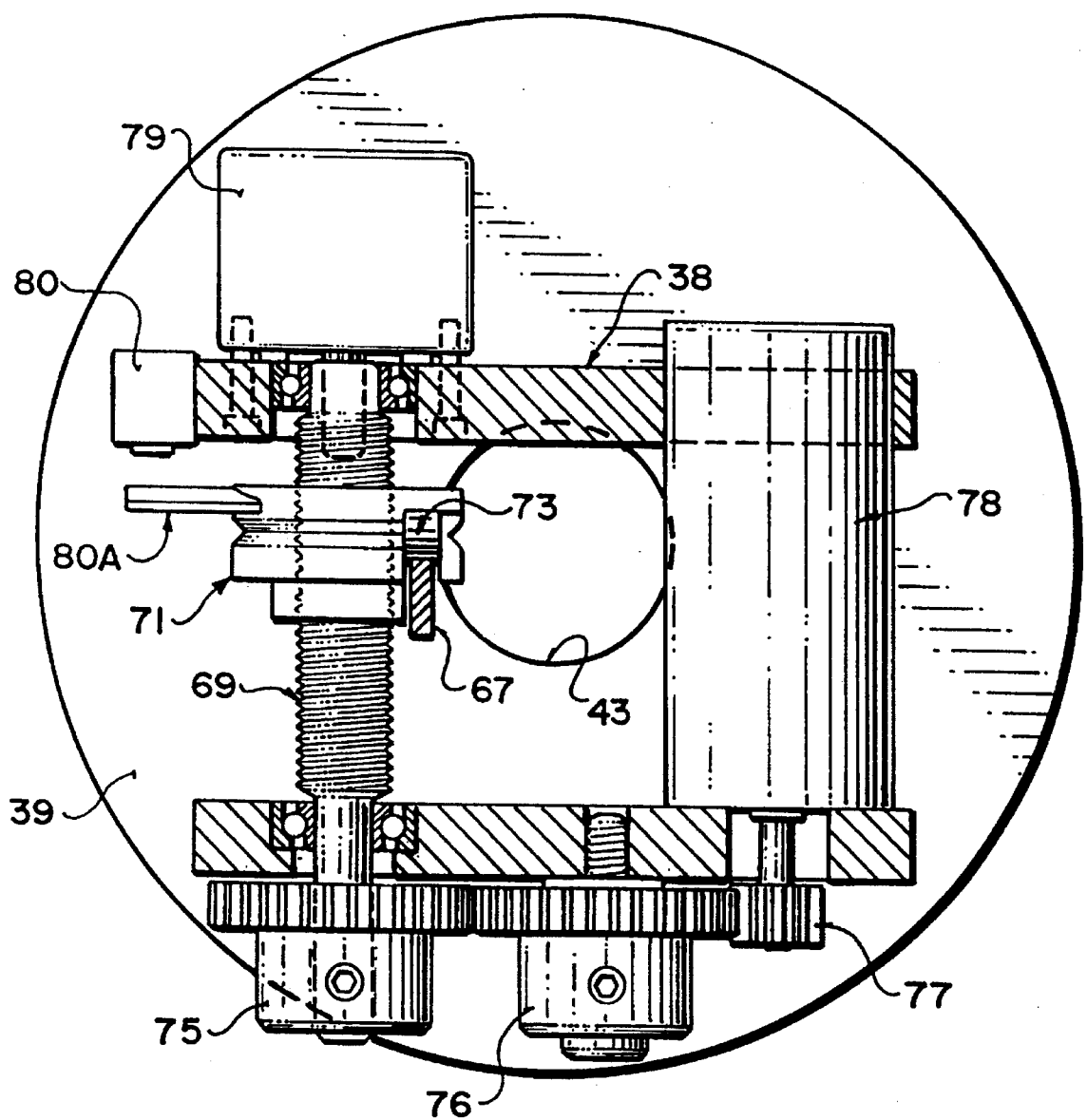
FIG. 4 is a plan section along the lines 4—4 in FIG. 2.

As shown in FIGS. 4 and 5, lead screw 69 is turned by means of a motor 78, which may be, for example, a Maxon D.C. motor model no. 2017.938-22.162-000 with a model no. 2916.804-0123.0-000 gearhead manufactured by Maxon Precision Motors of Burlingame, Calif., by means of gears 75, 76 and 77. The position of pin 73 along lead screw 69 is monitored by encoder 79 which measures the cumulative angle of rotation of rod 69.

First mirror 27 is pivotally mounted to frame 38 for rotation about an axis 81 which is perpendicular to axis 26.

First mirror 27 is mounted in a housing 82 which has an arm 83 extending past axis 65 to a position adjacent arm 67. A roller 85 attached to an end of arm 83 bears against a cam surface 87 which is preferably formed by an edge of arm 67. Cam surface 87 is preferably a straight line.

Bias means, such as spring 91, pivot first mirror 27 about axis 81 to maintain roller 85 in tight contact with cam surface 87. Axis 81 intersects perpendicularly axis 26. The force exerted by roller 85 on cam surface 87 also maintains arm 67 in contact with pin 73. The portion of arm 67 in contact with pin 73 is preferably concave and shaped as an arc of a circle. The radius and orientation of the arc are chosen such that the portion of arm 67 in contact with pin 73 for any position of pin 73 is generally vertical. This minimizes any error which could be caused by nut 71 rocking about lead screw 69.

When arm 67 is moved by means of lead screw 69, second mirror 29 is rotated about axis 65. At the same time, arm 67 presses on roller 85 thereby pushing arm 83 to pivot first mirror 27 about axis 81.

As shown in FIG. 4, a limit switch 80 is provided to prevent motor 78 from over-rotating lead screw 69 and forcing nut 71 against frame 38. When nut 71 nears frame 38, tab 80A contacts limit switch 80. Control electronics (not shown) detect when tab 80A switches limit switch 80 and prevent motor 78 from further rotating lead screw 69.

Figure 3:
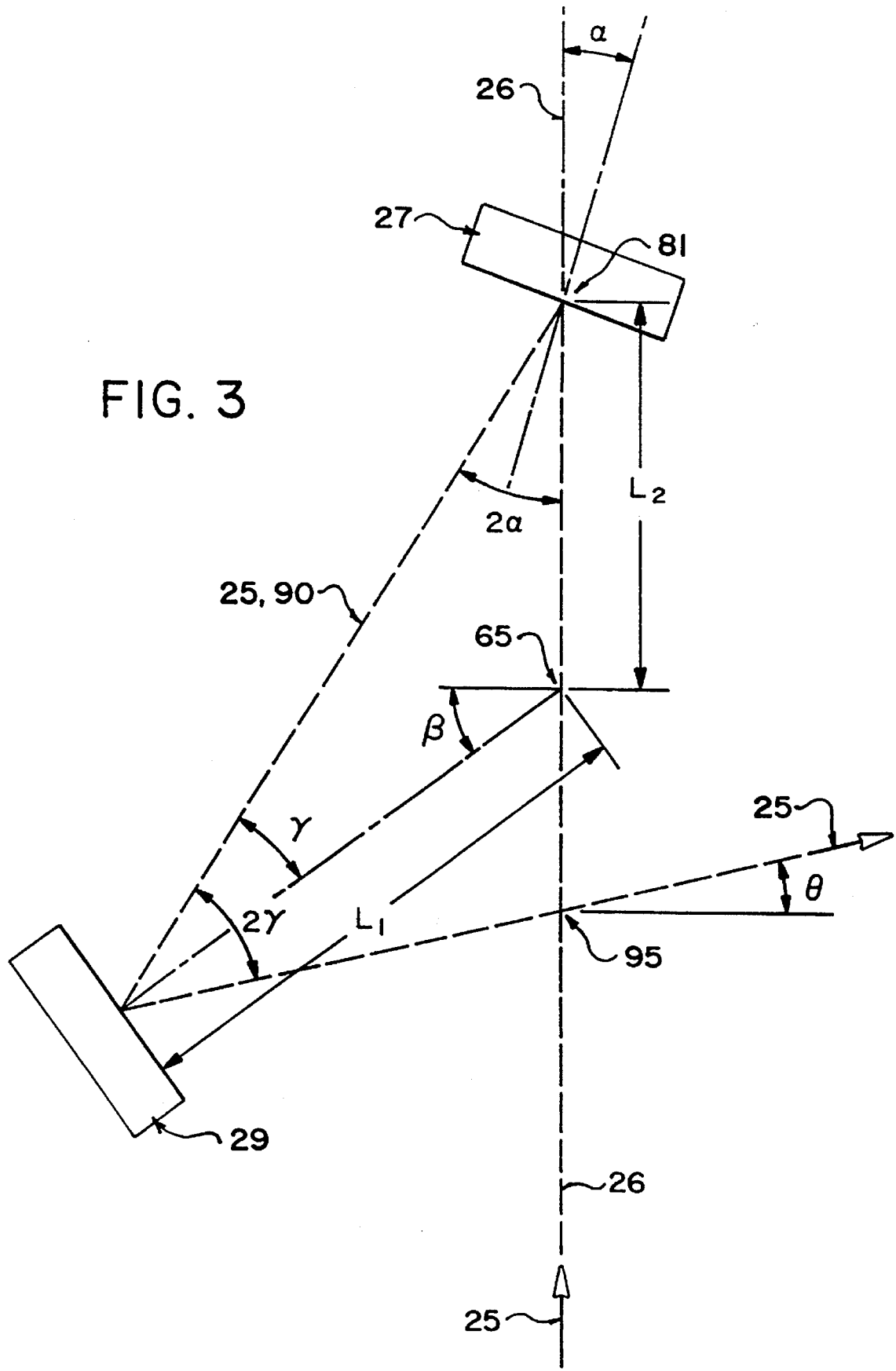
FIG. 3 is a schematic diagram illustrating the geometry of the laser beam deflector of FIG. 2.

The geometry of the deflection assembly 60 of FIG. 2 is illustrated in FIG. 3. It is desirable to construct deflecting assembly 60 so that mirrors 27 and 29 may be made as small as possible. Therefore, the movements of mirrors 27 and 29 must be coordinated so that laser beam 25 is always centred on first mirror 27 and that second mirror 29 is positioned so that after laser beam 25 has been deflected from first mirror 27 along path 90 it hits the centre of mirror 29.

As shown in FIG. 2, axis 81 passes through the planar reflective surface of first mirror 27 and intersects axis 26. Consequently, as long as laser beam 25 is projected along axis 26 by mirror 36, laser beam 25 is always incident on the centre of mirror 27. If mirror 27 is pivoted to an angle α relative to axis 26 then path 90 of deflected laser beam 25 will lie at an angle 2α to axis 26. The angle β of second mirror 29 is set so that second mirror 29 intercepts laser beam 25. Laser beam 25 is incident on second mirror 29 at an angle γ which, by the law of cosines is:

$$\gamma = \sin^{-1}(L_2/L_1) \sin(2\alpha)$$

Where $L_1$, is the distance from the reflective surface of second mirror 29 to pivot axis 65 and $L_2$ is the distance from pivot axis 65 to pivot axis 81. The surface of second mirror 29 is preferably perpendicular to a line extending between pivot axis 65 and second mirror 29. When laser beam 25 hits mirror 29 it is reflected at an angle 2γ and crosses axis 26 at point 95.

If the geometry is carefully chosen, then point 95 will not move as angle θ changes. Also, if the geometry is properly defined, laser beam 25 which is deflected from mirror 27 along path 90 will always be incident upon the centre of mirror 29. Furthermore, when this configuration is used, the angle θ of exiting laser beam 25 is relatively insensitive to small variations in the attitude of deflecting assembly 60. Wobble of deflecting assembly 60 could be caused, for example, by imperfections in bearings 45. The system is insensitive to changes in the attitude of deflecting assembly 60 because mirrors 27 and 29 are optically equivalent to the reflective sides in a pentaprism. It is known that small variations in the attitude of a pentaprism relative to a light beam incident on the pentaprism do not significantly affect the angle of the light beam emerging from the pentaprism.

A deflecting assembly 60 having fixed mirrors 27 and 29 may be used in a standard laser level to reduce the effect of wobble of deflecting assembly 60 on the angle of the emerging light beam. In such a laser level, the incident laser beam is preferably maintained level by an automatic levelling system. The emerging laser beam will sweep out a circular path with very little deviation from a horizontal plane despite the fact that there is likely to be some wobble of deflecting assembly 60.

The shape of cam surface 87, the shape of the portion of arm 67 which contacts pin 73, the positions of pivot axes 65 and 81, the sizes of pin 73 and roller 85, and the lengths of the arms of yoke 61 and arm 83 are all variables in the design of laser compass 20. A preferred method for arriving at the correct dimensions for the parts in a beam deflecting mechanism according to the invention is to model the parts in a computer aided design (CAD) system and to vary the part profiles until the assembly performs as required. Some design parameters are as follows:

1. First and second mirrors 27, 29 should be positioned so that laser beam 25 is centered on both mirrors throughout the desired range of angular deflection (which is typically −5 degrees to +25 degrees for a laser compass);
2. Point 95 at which laser beam 25 crosses axis 26 should be, as closely as possible, at the same point on axis 26 for all angles of deflection in the operating range of the device; and
3. For ease of manufacture, each of the cam surfaces should have a simple geometric shape, such as an arc of a circle or a straight line.

By applying these design criteria it is relatively straightforward to achieve a design which meets the design criteria in which cam surface 87 is a straight line and the front portion of arm 67 which bears on pin 73 is an arc of a circle.

A control unit (not shown) is preferably provided to set and monitor the angle θ by sending appropriate signals to motor 78 and reading the state of encoder 79. Electrical signals from the control unit may be carried to and from motor 78, encoder 79, limit switch 80 and any other electrical apparatus mounted to the rotating portion of the apparatus by means of a slip ring assembly 99.

While a beam deflecting apparatus has been described herein with reference to a laser compass a beam deflecting apparatus according to the invention may be used in other optical equipment where it is desirable to deflect a laser beam along a line at an angle to an axis.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A laser compass comprising:
   a) a base;
   b) a frame mounted to said base for rotation about an axis;
   c) a motor mounted on said base and operatively associated with said frame for rotating said frame about said axis;
   d) a laser mounted on said base for projecting a laser beam along said axis;
   e) deflection means for redirecting said laser beam at an angle to said axis, said deflection means comprising:
      i. a first mirror on said axis pivotally mounted to said frame for deflecting said laser beam along a first line at a first angle to said axis;
      ii. a second mirror on said first line pivotally mounted to said frame for deflecting said laser beam along a second line at a second angle to said axis; and
   f) mirror pivoting means for setting angles of said first and second mirrors relative to said axis, said mirror pivoting means comprising:
      i. a cam surface coupled to said second mirror for pivoting with said second mirror;
      ii. a first arm coupled to said first mirror for pivoting with said first mirror; and
      iii. bias means for biasing a cam-contacting surface on said first arm against said cam surface.

2. The laser compass of claim 1 wherein said mirror pivoting means further comprises a second arm coupled for rotation with said second mirror and positioning means for moving said second arm wherein said laser beam deflected by said second mirror intersects said axis.

3. The laser compass of claim 2 wherein said cam surface is on said second arm.

4. The laser compass of claim 3 wherein said cam surface has a straight line profile.

5. The laser compass of claim 4 wherein said cam-contacting surface is a bearing surface of a bearing mounted to said first arm.

6. The laser compass of claim 2 wherein said positioning means comprises a rotatable screw, a nut in threaded engagement with said screw and a nut-contacting surface of said second arm bears against said nut.

7. The laser compass of claim 6 wherein said nut-contacting surface has a concave arctuate profile.

8. The laser compass of claim 7 wherein a portion of said nut contacting surface bears against a projection on said nut and a tangent to said portion of said nut-contacting surface is generally perpendicular to said rotatable screw.

9. The laser compass of claim 6 wherein said axis and said laser beam pass through an aperture in said frame.

10. The laser compass of claim 1 wherein said first mirror is planar and an axis of pivotal rotation of said first mirror coincides with a reflective surface of said first mirror.

11. The laser compass of claim 10 wherein said axis of pivotal rotation of said first mirror perpendicularly intersects said axis.

12. The laser compass of claim 10 wherein said second mirror is fixed to a member, and said member is pivotally mounted to said frame for pivoting about a second pivot axis.

13. The laser compass of claim 12 wherein said second pivot axis intersects perpendicularly said axis.

14. The laser compass of claim 13 wherein said axis of pivotal rotation of said first mirror perpendicularly intersects said axis.

15. Apparatus for deflecting a laser beam being projected along an axis by a laser, said apparatus comprising
   a) a frame;
   b) deflection means on said frame for redirecting said laser beam at an angle to said axis, said deflection means comprising:
      i. a first mirror on said axis pivotally mounted to said frame for deflecting said laser beam along a first line at a first angle to said axis;
      ii. a second mirror on said first line pivotally mounted to said frame for deflecting said laser beam along a second line at a second angle to said axis; and
   f) mirror pivoting means for adjusting angles of said first and second mirrors relative to said axis, said mirror pivoting means comprising:

i. a cam surface coupled to said second mirror for pivoting with said second mirror;
ii. a first arm coupled to said first mirror for pivoting with said first mirror;
iii. bias means for biasing a cam-contacting surface on said first arm against said cam surface; and
iv. a linkage for moving said second mirror to a desired angle to said frame and holding said second mirror at said desired angle wherein said cam surface is shaped such that when said second mirror is at said desired angle said first angle is such that said first mirror directs said laser beam onto said mirror.

16. The apparatus of claim 15 wherein said cam surface has a straight-line profile.

17. A laser compass comprising:
a) a housing;
b) a frame rotatably mounted to said housing for rotation about an axis;
c) a motor in said housing and coupled to said frame for rotating said frame about said axis;
d) a laser mounted in said housing for projecting a laser beam along said axis;
e) deflection means for redirecting said laser beam at an angle to said axis, said deflection means comprising:
i. a first mirror on said axis pivotally mounted to said frame for deflecting said laser beam along a first line at a first angle to said axis;
ii. a second mirror on said first line pivotally mounted to said frame for deflecting said laser beam along a second line at a second angle to said axis; and
f) mirror pivoting means for setting angles of said first and second mirrors relative to said axis, said mirror pivoting means comprising:
i. a cam surface coupled to said second mirror for pivoting with said second mirror;
ii. a first arm coupled to said first mirror for pivoting with said first mirror, and,
iii. bias means for biasing a cam-contacting surface on said first arm against said cam surface.

* * * * *